P. G. Sabins,
Fish-Net,

No. 99,713. Patented Feb. 8, 1870.

Witnesses
Jonathan Slade
Charles E. Mills

Inventor
Philander G. Sabins

United States Patent Office.

PHILANDER G. SABINS, OF WESTPORT, ASSIGNOR TO HIMSELF AND WILLIAM H. PIERCE, OF FALL RIVER, MASSACHUSETTS.

*Letters Patent No. 99,713, dated February 8, 1870.*

---

IMPROVEMENT IN FISH-NET.

---

The Schedule referred to in these Letters Patent and making part of the same.

---

Be it known that I, PHILANDER G. SABINS, of Westport, in the county of Bristol, and State of Massachusetts, laborer, have invented a new and useful Machine or Device, which I call the "Sabin's Spring Purse-Net," the use of which is to catch bottom fish; and I do hereby declare that the following is a full, clear, and exact description of the construction and operation of the same, reference being had to the annexed drawings, making a part of this specification, in which—

Figure 1:
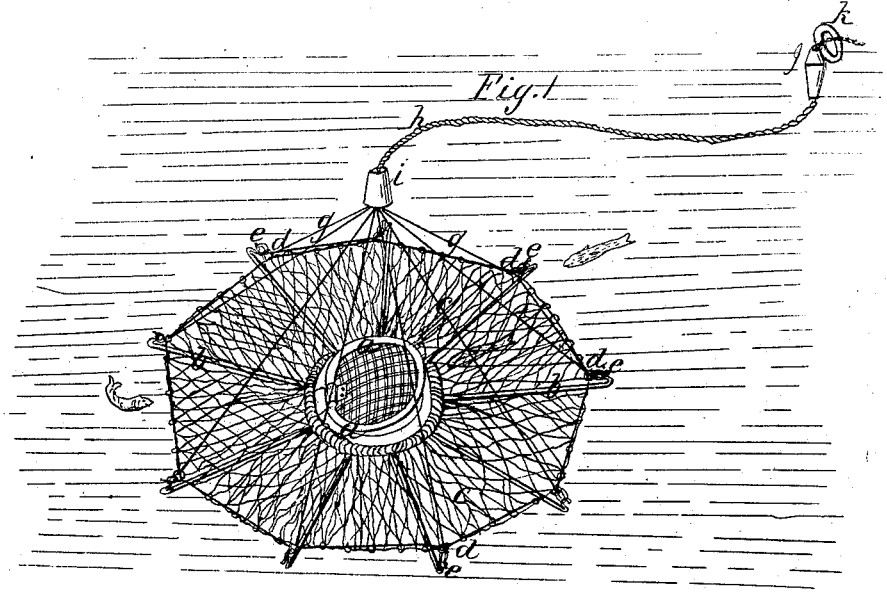
Figure 1 is a perspective view of said device, when set for fish.

To describe and explain the construction and operation of the "spring purse-net," I begin at what I call the "bait-pan," $a\ a$, seen in the centre of fig. 1, which consists of two parts—the part on which the bait is spread, and the cover that secures the bait upon it. The part upon which the bait is spread is made of sheet-brass, is circular, and slightly concave in form, with the concave surface downward. The size or diameter of the bait-pan may vary, according to the size of the "spring purse-net" to be constructed.

The cover is made of brass wire, formed into a network, and joined to the part upon which the bait is spread, at the point $a$, by a hinge-joint, and fastened at the opposite point $a$ to the lower part of the bait-pan, by a spring, or seized to it with marlin.

This wire cover answers the double purpose of exhibiting the bait to the sight of the fish, and securing it in its place at the same time.

I next describe what I call the "spring-rod," seen at $b\ b$ in both figures. There are nine of these spring-rods, made of brass wire, from one-quarter to one-half inch in diameter, and their length is determined by the size of the net to be applied to them. They must be of equal length, and reach from the bait-pan outward, a little beyond the outer periphery of the net, as seen at $d\ d$, in fig. 1. The inner ends of these rods pass through holes, made for the purpose, in the lower part of the bait-pan, near its lower edge, and are secured to it by means of a nut and thread on each rod. The rods extend outward in the same plane, like spokes from the hub of a wheel, and at equal distances apart. The outer ends of these rods are all turned, so as to form a hook outward.

I next describe the net $c\ c$, and its combination with the bait-pan and spring-rods. It is knit of common seine-twine. An opening of the same shape and size, or diameter, as the bait-pan, is left in the centre of the net, into which the bait-pan $a\ a$ is secured, above the spring-rods $b\ b$, by means of small cord or marlin. A small cord or line forms the outer periphery of the net. The net is circular in form.

At points on the periphery aforesaid, adjacent (when the net is spread) to the outer or hook ends of the spring-rods, I attach or seize brass rings $d\ d$, about two inches in diameter, with another ring of the same dimensions seized to each of them, the planes of the two being at right angles to each other.

The rings $d\ d$, I call the large purse-rings, and the rings $e\ e$, seized to them, I call the spring-rings.

These rings, seized together, are seen at $d\ e$, in fig. 1. The spring-rings $e\ e$ serve to hold the net in place, when set, by being caught over the ends of the hooks of the spring-rod, as seen in fig. 1, at $e\ e$. Between the large purse-rings $d\ d$, and at equal distances from them and from each other, are smaller brass rings, seized to the periphery aforesaid, seen in fig. 1.

Figure 2:
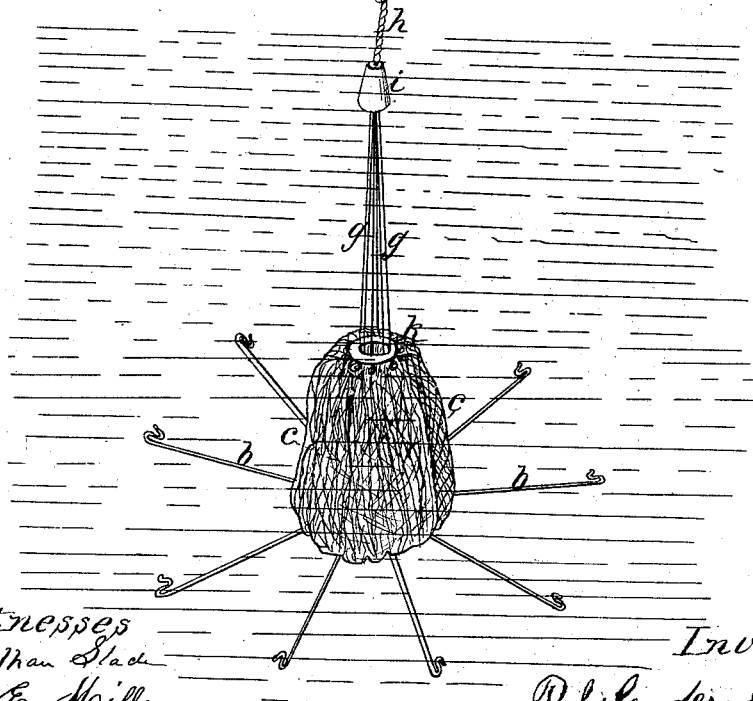
Figure 2 is a perspective view of the same, when pursed, so as to hold the fish in it securely.

I will next describe what I call the "purse-lines," or leaders. These are nine, of equal length and size, seen at $g\ g$, figs. 1 and 2. They must not be too large to pass through the small rings on the periphery of the net. One end of each purse-line is fastened to each of the large purse-rings $d\ d$, and the other end of each is passed through the intervening small purse-ring and the large purse-ring next to it, all in the same direction. Then I take up the loose ends of all the leaders together, and fasten them to what I call the main leader $h$, and also within and to the buoy $i$, seen in figs. 1 and 2. The buoy $i$ is made of cork or light wood, which, by its tendency to rise to the surface of the water, keeps the purse-leaders taut above the net. The main rope or leader $h$ serves to draw up the net by.

There is another buoy, $j$, made the same as the buoy $i$, both having apertures through them. The end of the main leader $h$ is fastened to the buoy $j$, which floats on the surface, and serves to mark the spot where the net is set.

A heavy ring, $k$, with orifice large enough to pass over both buoys, is carried in a boat, and slipped over the main leader $h$, when the net is about to be drawn up. It prevents the net from opening, by passing down around the purse-leaders $g\ g$.

Now, to catch fish with the "Sabin's spring purse-net," first fasten the bait on the bait-pan before described. Set the net, by catching the spring-rings $e\ e$ over the spring-rod hooks, as seen at $e\ e$, in fig. 1. Then, by the main leader $h$, lower the device to the bottom of the water. It will then be in position, as seen at fig. 1. If fish are in the vicinity, they will be attracted by the bait in the bait-pan, over the net. After a short time, draw the net up, by taking hold of the main leader $h$; slip the large ring $k$ down around it, and continue to draw upon it, until the net reaches the surface. Drawing on the main leader $h$ draws on all the purse-leaders $g\ g$ at the same time. The purse-leaders thus act on the purse-rings $d\ d$, and these rings, in turn, act in the spring-rings $e\ e$, springing upward the spring-rods, until the spring-rings $e\ e$ unhook from the spring-rods, and the net is instantly pursed by the action of the small purse-leaders $g\ g$, on the purse-rings $d\ d$, and the net takes the form seen in fig. 2. It is firmly held in that position by the heavy ring before described, seen at $l$, in figs. 1 and 2, so no fish can escape through the mouth of the net while being drawn up.

What I claim as my invention, and desire to secure by Letters Patent, is—

1. The combination, with the leaders $g$ and rings $d\ e$, of the hooked spring-rods $b$, as described, for purpose set forth.

2. The purse-net $c$, provided with the bait-box $a$, in combination with the spring-rods $b$ and leaders $g$, as and for the purposes described.

PHILANDER G. SABINS.

Witnesses:
 JONATHAN SLADE,
 CHAS. E. MILLS.